Patented June 25, 1946

2,402,825

UNITED STATES PATENT OFFICE 2,402,825

METHOD OF PREPARING AND PURIFYING DICARBOXYLIC ACIDS

Lawrence L. Lovell, Wood River, and Edward J. Jahn, Edwardsville, Ill., assignors to Shell Development Company, San Francisco, Calif., a corporation of Delaware No Drawing. Application June 23, 1943, Serial No. 492,186

3 Claims. (Cl. 252—56)

1

The present invention relates to a process for the purification of dicarboxylic acids. More particularly, it is concerned with the removal of certain undesirable organic products which are commonly produced in "side reactions" during the manufacture of dicarboxylic acids intended for use as corrosion inhibitors.

It is known that dicarboxylic acids having at least 16 and preferably 20–60 carbon atoms are potent and useful corrosion inhibitors for various metals, especially iron and its alloys when employed in relatively low concentrations as additives to various substantially neutral or slightly acidic vehicles, e. g. oils that contact them. Either pure acids or mixtures of several different acids may be used to prevent the corrosion of these metals.

It has been found that the production of corrosion inhibitors of this type is often accompanied, especially when their synthesis is carried out on a commercial scale, by unwanted by-products of an organic nature the presence of which adversely affects the corrosion inhibiting powers of these dicarboxylic acids. It has been found that the elimination of these impurities from contaminated additive agents greatly improves their anti-corrosive properties. Further, these impurities have been found to be detrimental to the emulsion properties of organic substances, e. g. turbine oils containing them.

It is an object of this invention to purify corrosion inhibiting dicarboxylic acids. It is another object to remove these harmful organic by-products from dicarboxylic acids intended to be used as anti-corrosive agents in water-immiscible solvents of various characters.

It has been found that certain harmful organic by-products which may contaminate dicarboxylic acids intended as anti-corrosion agents have neutralization numbers higher than said dicarboxylic acids. These by-products can be readily removed by treatment according to this invention, which comprises treating crude mixtures of the dicarboxylic acids having at least 16 carbon atoms per molecule with water under conditions to hydrate those impurities. The hydrated mixture so prepared is dissolved in an organic water-immiscible liquid, whereby a flocculer precipitate is formed. The resulting solution may then be agitated. Under these circumstances, we have found that the hydrated precipitated impurities can readily be made to agglomerate, and may be separated. Any excess water from the hydration that may be present may also be separated.

The nature of the harmful impurities has not been definitely established, it being known, however (as already indicated), that they possess higher neutralization numbers than the desired dicarboxylic acids. The lowest corrosion inhibiting dicarboxylic acid has 16 carbon atoms which corresponds to a neutralization number of about 395, and as a rule the harmful impurities have neutralization numbers in excess of 400. It is possible that these impurities are dicarboxylic acids of lower molecular weights, or polycarboxylic acids containing 3 or more carboxyl radicals, or both.

Following are examples of dicarboxylic acids which may be employed as corrosion inhibitors when added to oils and other water-insoluble organic substances and which may be contaminated with impurities of the type described. In general they may be represented by the formula

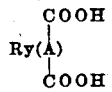

wherein A represents a carbon atom or a group of atoms comprising carbon which may be arranged in straight or branched chain, or cyclic, and may, if desired, contain one or more of the following elements: O, S, Se, Te, N; $y$ is an integer equal to or smaller than the positions in A which may carry alkyl radicals; and R represents hydrocarbon radicals (which may contain chlorine) at least one R being an aliphatic radical which may be paraffinic or olefinic.

Specific examples of this class are: alkyl malonic acids, e. g. cetyl malonic acid, stearyl malonic acid, oleyl malonic acid, octyl cetyl malonic acid, etc.; alkyl succinic acids such as are produced by condensing maleic acid anhydride with $C_{12}$ and higher mono-olefins, hydrolyzing the reaction product, and, if desired, hydrogenating the hydrolyzed material to remove olefinic double bonds; alkylated glutaric, adipic, pimelic, suberic, azelic, sebacic, undecane dicarboxylic, etc., acids; dimerized oleic acid; di fatty acid ether, sulfides, disulfides, selenides, tellurides and amines, wherein the ether, sulfide, etc., radical may form part of the bridge linking the carboxyl radicals, or may branch therefrom, such as dilauric acid sulfide, dimyristic acid sulfide, dipalmitic acid sulfide, distearic acid sulfide, alpha stearic ortho benzoic acid sulfide, succinic acid, mono and di-alkyl sulfides, corresponding ethers, disulfides, selenides, tellurides, amines, etc.

Different dicarboxylic acids call for different methods of manufacture. For example, alkyl or alkylene succinic acids may be manufactured by a process involving the condensation of mono olefines with maleic acid anhydride (as described in U. S. patent, Moser, 2,133,734). It is particularly in this reaction that purely organic by-product compounds are formed which frequently reduce the anti-corrosive powers of the main condensation product.

In carrying out our purification, we have found it convenient to hydrate these impurities by thoroughly contacting the crude dicarboxylic acid mixture preferably at elevated temperatures, for example, 150°–240° F. and preferably between about 185–200° F. with water. If temperatures above about 212° C. are employed in this step, superatmospheric pressure is desirable to prevent the water from boiling away. If the amount of water used is not more than about 10% by weight, a homogeneous hydrated phase is obtained. Larger amounts will result in the separation of a water phase which may be removed. Hydrating with amounts of water sufficient to form an aqueous layer may be of advantage, in that it causes water-soluble impurities, for example unreacted maleic acid anhydride, to be washed out. Maleic acid is a strong rust promoter, as is well known.

The hydrated phase is then dissolved in a water-immiscible solvent to form a solution which should contain at least about 0.2% of dissolved dicarboxylic acids. The upper limit of the dicarboxylic acid concentration in the solution depends on the solubility of the acids in the solvent. As a rule, it is desirable to produce as high a concentration as is practical. Thus it may be 5%, 10% or even higher.

Heating may be required to effect the dissolution. A floccular, undissolved residue remains in suspension comprising the hydrated impurities. This suspension may be separated by filtration, centrifuging, settling and decantation or by other means. Excess water, if present, can be removed likewise. Separation of the suspended material is facilitated by blowing the solution at temperatures between about 150°–240° F. with an inert gas, for example, nitrogen, hydrogen, carbon dioxide, flue gases, hydrocarbon gases, and the like. Such blowing not only causes agglomeration of the floccular suspended residue and improves the filterability, but also it further improves the corrosion inhibiting powers of the purified acids. The temperature of the blowing has a considerable influence, optimum blowing temperatures being between about 180 to 200° F. The blowing time may conveniently be about ½–5 hours.

The treated solution may be used as such for corrosion inhibiting purposes, or may be blended with the same or other suitable vehicles to result in the proper concentration of the purified dicarboxylic acids. Such vehicles may comprise various substantially neutral or slightly acidic substances which may be polar or non-polar. Examples are liquid butanes, pentanes, hexanes, heptanes, octanes, benzene, toluene, xylenes, cumene, indene, hydrindene, alkyl naphthalenes; gasoline distillates, kerosene, gas oil, lubricating oils (which may be soap-thickened to form greases), petrolatum, paraffin wax, albino asphalt, carbon tetrachloride, ethylene dichloride, propyl chloride, butyl chloride, chlor benzol, chlorinated kerosene, chlorinated paraffin wax; alcohols, such as methyl, ethyl, propyl, isopropyl, butyl, amyl, hexyl, cyclohexyl, heptyl, methyl cyclohexyl, octyl, decyl, lauryl, myristyl, cetyl, stearyl, benzyl, etc., alcohols; polyhydric alcohols as ethylene glycol, propylene glycol, butylene glycol, glycerol, methyl glycerol, etc.; phenol and various alkyl phenols; ketones as acetone, methyl ethyl ketone, diethyl ketone, methyl propyl, methyl butyl, dipropyl ketones, cyclohexanone and higher ketones; keto alcohols as benzoin, ethers as diethyl ether, diisopropyl ether, diethylene dioxide, beta-beta dichlor diethyl ether, diphenyl oxide, chlorinated diphenyl oxide, diethylene glycol, triethylene glycol, ethylene glycol monomethyl ether, corresponding ethyl, propyl, butyl ethers; neutral esters of carboxylic and other acids as ethyl, propyl, butyl, amyl, phenyl, cresyl and higher acetates, propionates, butyrates, lactates, laurates, myristates, palmitates, stearates, oleates, ricinoleates, phthalates, phosphates, phosphites, thiophosphates, carbonates; natural waxes as carnauba wax, candelilla wax, Japan wax, jojoba oil, sperm oil; fats as tallow, lard oil, olive oil, cottonseed oil, perilla oil, linseed oil, tung oil, soya bean oil, flaxseed oil, etc.; weak bases as pyridine, alkyl pyridines, quinolines, petroleum bases, etc.

As is known, the useful concentration of the dicarboxylic acids in highly refined oils may be considerably below .1% and frequently is below between about .001 to .01%. With other vehicles, the required concentration may be higher, e. g. up to about 1% or even higher.

Solvents suitable in the precipitation of the hydrated impurities may be chosen from the above list of vehicles, provided the solvent is liquid and substantially water-insoluble under the treating conditions. Preferred solvents are as a rule hydrocarbons or chlorinated hydrocarbons. If blowing is employed as described, the solvent should be relatively high boiling, i. e. should have a boiling temperature (or initial boiling point in case of a mixture) not less than about 100° F. above the blowing temperature.

Since the dicarboxylic acids are most frequently employed in lubricating oils for corrosion inhibiting purposes, it is usually most advantageous to use as the solvent a lubricating oil to effect the precipitation and to produce the treated concentrate which later is diluted with the same or similar lubricating oil to obtain the optimum concentration of the dicarboxylic acid for the desired purpose.

*Example*

A mixture of alkylene succinic acids was prepared by condensing $C_{18}$ mono-olefines with maleic acid anhydride by heating in an iron vessel. The resulting condensation product was hydrolyzed, and unreacted constituents were removed by steaming.

To a portion of the alkylene succinic acid was added 10% by weight water. The mixture was heated and stirred at 190° F. until it was homogeneous. The warm mixture was then added to a highly refined turbine oil to result in a concentrate containing 0.5% alkylene succinic acids. At the same time, the oil became cloudy due to dispersed water droplets. This concentrate was maintained at a temperature of 190 to 195° F. for about two hours during which time nitrogen was blown through it. Under these conditions hydrated impurities were coagulated and excess water was driven off by the nitrogen. The coagulated impurities were then separated by filtration, and the resulting turbine oil was diluted with further quantities of turbine oil to produce a finished turbine oil containing .002% by weight of the alkylene dicarboxylic acids.

The finished turbine oil gave perfect rust protection under the following conditions:

A polished steel strip was immersed in an agitated mixture of 90% of the turbine oil and 10% distilled water at a temperature of 167° F. for 48 hours.

In a similar test carried out with the same turbine oil, but containing raw dicarboxylic acids in the same concentration, the steel strip was rusted about 25%.

We claim as our invention:

1. A process for the preparation of a dicarboxylic acid composition and for the purification of said composition, said composition having corrosion inhibiting properties and comprising essentially as the active ingredient dicarboxylic acids which have at least 16 carbon atoms per molecule, which comprises condensing maleic anhydride with a mixture of mono-olefinic aliphatic hydrocarbons having at least 12 carbon atoms per molecule and forming corresponding acid anhydride condensation products, removing any unreacted maleic anhydride and unreacted hydrocarbons, treating the said condensation product with at least about 10 percent by weight of water in the absence of added alkali at a temperature between about 150° and 240° F. and forming a water phase and a reaction product phase containing dicarboxylic acids having at least 16 carbon atoms and impurities having corrosion promoting properties, separating said phases, mixing the reaction product phase with a substantially water-insoluble, normally liquid hydrocarbon solvent for said dicarboxylic acids and which is a non-solvent for said impurities whereby the former are dissolved and at least a portion of the latter form a precipitate, and separating said precipitate from the resulting solution.

2. A process for the preparation of a dicarboxylic acid composition and for the purification of said composition, said composition having corrosion inhibiting properties and comprising essentially as the corrosion inhibiting substances dicarboxylic acids which have at least 16 carbon atoms per molecule, which comprises condensing maleic anhydride with a mixture of mono-olefinic aliphatic hydrocarbons having at least 12 carbon atoms per molecule and forming corresponding acid anhydride condensation products, removing any unreacted maleic anhydride and unreacted hydrocarbons, treating the said condensation product with at least about 10 per cent by weight of water in the absence of added alkali at a temperature between about 150° and 240° F. and forming a water phase and a reaction product phase containing dicarboxylic acids having at least 16 carbon atoms and impurities having corrosion promoting properties, separating said phases, mixing the reaction product phase with a mineral lubricating oil having a boiling temperature of not less than about 100° F. and which is a non-solvent for said impurities whereby the former are dissolved in said oil and at least a portion of the latter form a precipitate, and separating said precipitate from the resulting solution.

3. A process for the preparation of a dicarboxylic acid composition and for the purification of said composition, said composition having corrosion inhibiting properties and comprising essentially as the active ingredient dicarboxylic acids which have at least 16 carbon atoms per molecule, which comprises condensing maleic anhydride with a mixture of mono-olefinic aliphatic hydrocarbons having at least 12 carbon atoms per molecule under conditions which form corresponding acid anhydride condensation products and forming such products, removing any unreacted maleic anhydride and unreacted hydrocarbons, treating the said condensation product with at least about 10 per cent by weight of water in the absence of added alkali at a temperature between about 150° and 240° F. and forming a water phase and a reaction product phase containing dicarboxylic acids having at least 16 carbon atoms and impurities in minor amount having corrosion promoting properties, separating said phases, mixing the reaction product phase with a mineral lubricating oil having a boiling temperature of not less than about 100° F. and which is a non-solvent for said impurities whereby the dicarboxylic acids are dissolved and at least a portion of the impurities form a precipitate, blowing the resulting mixture with an inert gas at a temperature between about 150° F. and 240° F. to agglomerate said precipitate, and separating said agglomerated precipitate from the resulting solution.

LAWRENCE L. LOVELL.
EDWARD J. JAHN.